United States Patent [19]

Dietz et al.

[11] Patent Number: 4,460,193
[45] Date of Patent: Jul. 17, 1984

[54] PULL TYPE SWATHER ASSEMBLY AND MOUNTING THEREFOR

[75] Inventors: Frank J. Dietz; Reuben G. Bahnman, both of Loreburn, Canada

[73] Assignee: Autotran Swather Limited, Loreburn, Canada

[21] Appl. No.: 383,485

[22] Filed: Jun. 1, 1982

[30] Foreign Application Priority Data

Nov. 5, 1981 [CA] Canada ................................. 389519

[51] Int. Cl.³ .............................................. B62D 53/00
[52] U.S. Cl. ................................ 280/415 R; 172/248;
 172/383; 280/444
[58] Field of Search .................... 280/415 R, 444, 445;
 172/248, 383, 386, 324, 328

[56] References Cited

U.S. PATENT DOCUMENTS 2,470,842  5/1949  Barrington ........................... 280/444
3,919,831 11/1975  Halls .................................. 280/415 R
4,119,329 10/1978  Smith ................................. 280/415 R
4,186,806  2/1980  Ward .................................... 172/324
4,361,341 11/1982  Gustafson .......................... 280/415 R Primary Examiner—Joseph F. Peters, Jr.
Assistant Examiner—Joseph G. McCarthy
Attorney, Agent, or Firm—Stanley G. Ade

[57] ABSTRACT

The table knife and reel assemblies of a swather are bolted to a main mounting beam which in turn is mounted on a pair of double wheel assemblies one each adjacent each end thereof. The hitch pole from the tractor or other source of power is pivotally secured adjacent one end of said main mounting beam. In the hydraulic embodiment, piston and cylinder assemblies move the pole and the wheels between the field and transport positions and in the mechanical embodiment, linkage is provided between the pole and the wheel assemblies and the pole is moved by the tractor. In the hydraulic embodiment, a sequencing valve may be provided in conjunction with the table adjusting piston and cylinder which operates the piston and cylinder controlling the wheels when the table is raised and lowered between the field and transport positions.

12 Claims, 9 Drawing Figures

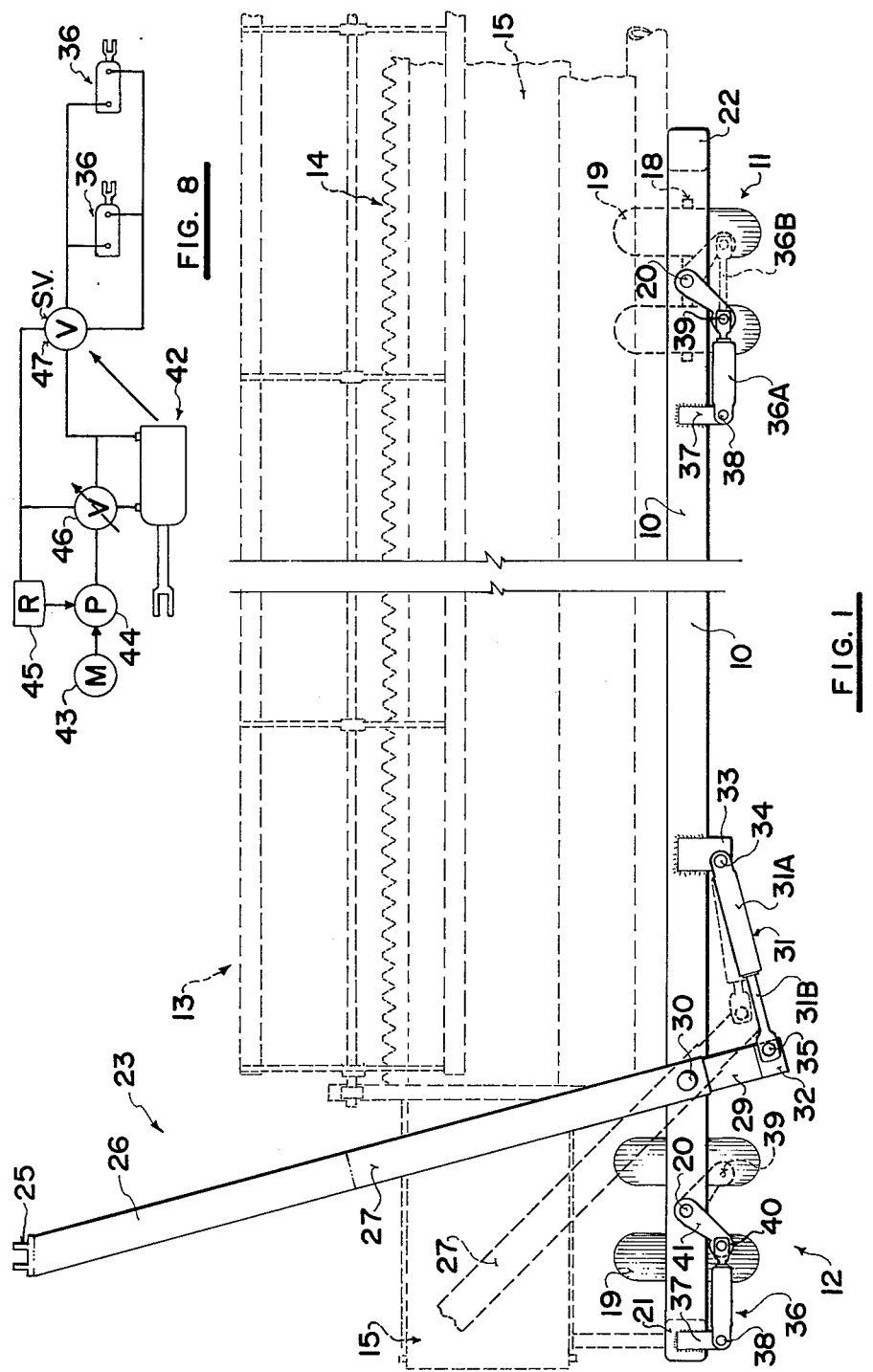

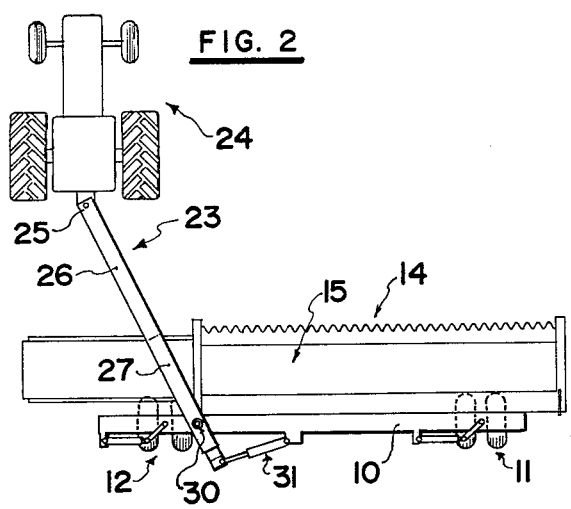
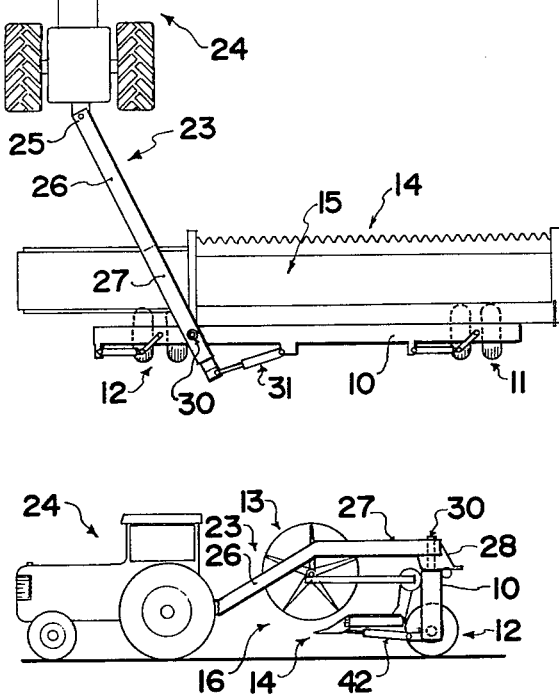
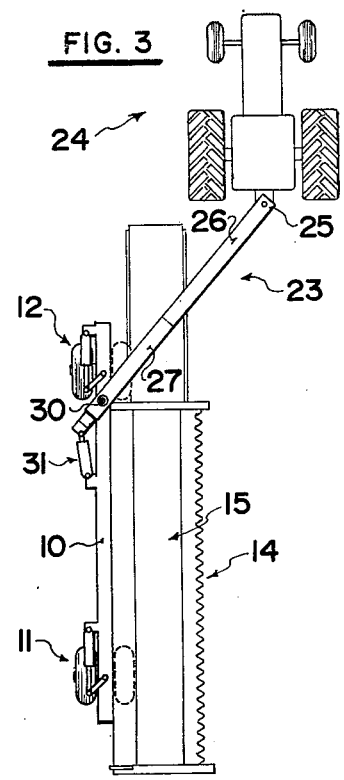
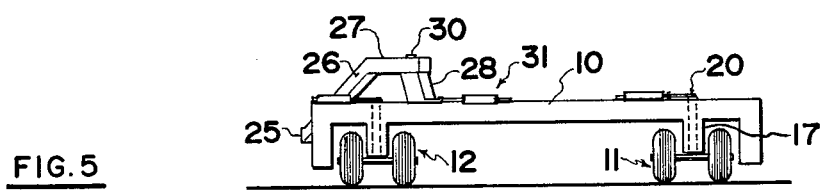
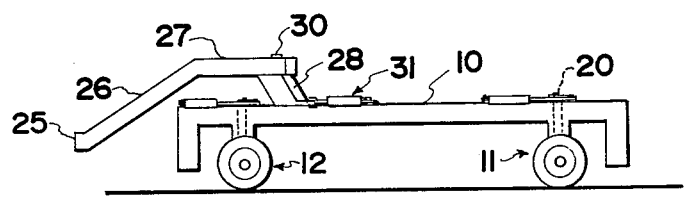

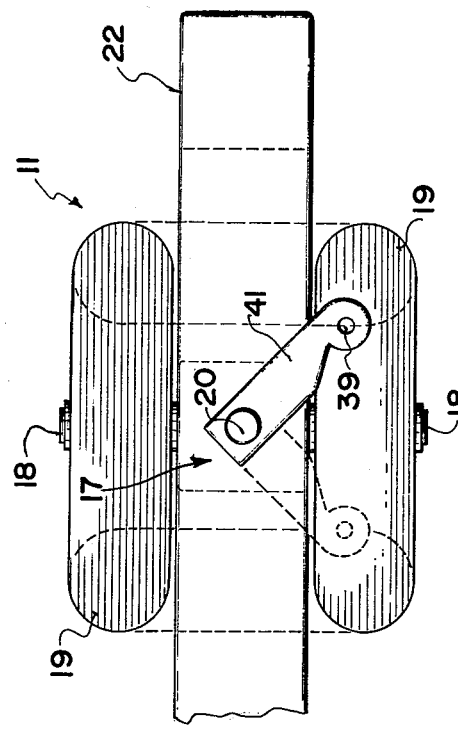
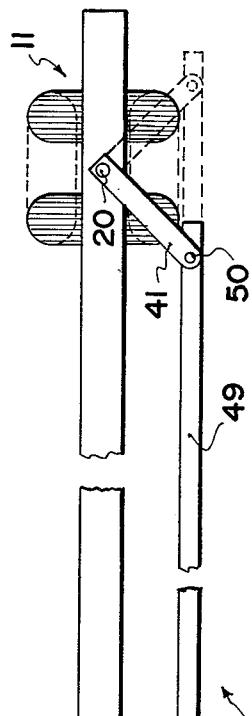
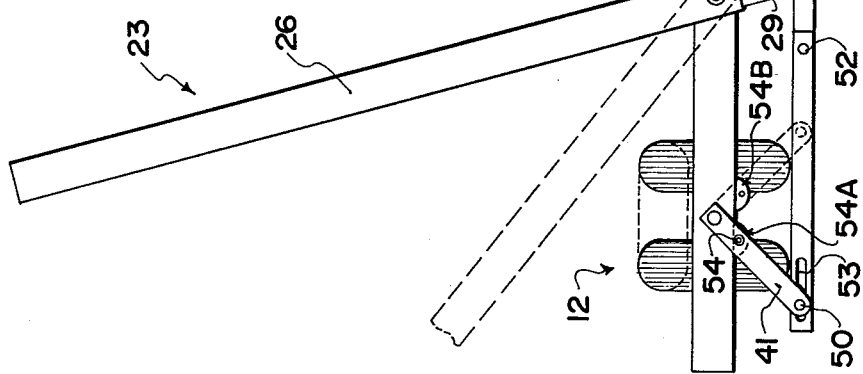
FIG. 7
FIG. 9

PULL TYPE SWATHER ASSEMBLY AND MOUNTING THEREFOR

BACKGROUND OF THE INVENTION

This invention relates to new and useful improvements in mounting assemblies for pull type swathers.

Relatively wide conventional pull type swathers are difficult to manoeuver through gateways, road allowances and the like and many relatively involved constructions have been provided in the prior art, in order to move the pull type swather from the field position either to a transport or semi-transport position so that the overall width of the implement, when in the transport position, permits it to be pulled behind a tractor or the like, through gateways, roads and the like.

However the majority of these mechanisms are relatively involved and often interfere with the efficient operation of the pull type swather.

SUMMARY OF THE INVENTION

The present invention overcomes these disadvantages by providing a relatively simple contruction which can be operated hydraulically or mechanically and which can either be manufactured as original equipment, or, in the preferred embodiment, utilize the main components of a pull type swather, which components can be bolted to the relatively simple main mounting beam assembly.

In accordance with the invention there is therefor provided a mounting assembly for pull type swathers comprising in combination a main mounting beam, a wheel assembly pivotally mounted adjacent each end thereof for pivotal movement around a vertical axis, from a field position to a transport position and vice versa, a hitch pole assembly pivotally secured by adjacent one end thereof to said main mounting beam adjacent one end of said main mounting beam, and means to move said hitch pole assembly relative to said main mounting beam, from a field position to a transport position and vice versa.

In a further embodiment of the invention, the main mounting beam may be provided with a swather table, a knife assembly and a reel assembly all operatively secured to the main mounting beam and extending forwardly thereof.

Another advantage of the invention is that it can be actuated hydraulically or mechanically.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a top plan view of the device showing the hydraulic embodiment.

FIG. 2 is a schematic top plan view of the invention shown in the field position behind a tractor.

FIG. 3 is a schematic top plan view of the invention shown in the transport position behind a tractor.

FIG. 4 is a schematic side elevation of the invention shown in the field position behind a tractor.

FIG. 5 is a schematic rear view of the invention in the field position.

FIG. 6 is schematic rear view of the invention in the transport position.

FIG. 7 is a fragmentary top plan view of one of the wheel assemblies per se.

FIG. 8 is a schematic view of the hydraulic system.

FIG. 9 is a top plan view of the invention showing the mechanical embodiment.

In the drawings like characters of reference indicate corresponding parts in the different figures.

DETAILED DESCRIPTION

Proceeding therefore to describe the invention in detail, reference character 10 illustrates the main mounting beam which is preferably of square cross section and which is mounted or supported upon a pair of twin wheel assemblies collectively designated 11 and 12. A swather assembly shown schematically, is collectively designated 13 and consists of a knife assembly collectively designated 14, a swather table assembly collectively designated 15, and a reel assembly collectively designated 16 all of which are shown schematically in FIGS. 2, 3 and 4 and which are conventional in construction and operation. In the present invention, these three items 14, 15 and 16 may either be built as original equipment upon the main mounting beam 10 or, alternatively, may be detached from the conventional rear frame member of a pull type swather assembly and secured by conventional means to the main mounting beam 10, and extends forwardly therefrom.

Each of the wheel assemblies 12, consists of a combination wheel fork assembly 17 having spindles 18 mounting conventional tired wheels 19 for rotation. The wheel fork assemblies 17 include an upwardly extending mounting pin 20 journalled for rotation within bearings (not illustrated) extending or secured to the main mounting beam with the wheel assembly 12 being adjacent one end 21 thereof and the wheel assembly 11 being situated adjacent the other end 22 thereof.

These pins 20 mount the wheel fork assemblies for rotation around a vertical axis and can be moved between field and transport positions as will hereinafter be described.

A hitch pole assembly is provided collectively designated 23 and extending between the main mounting beam 10 and a source of power such as a tractor 24 to which it may be connected by means of a conventional hitch 25, by one end thereof.

The hitch pole assembly includes a front portion 26 which extends upwardly and rearwardly from the tractor 24, a rear horizontal section 27 extending rearwardly from the rear end of the portion 26 and a substantially vertical downward portion 28 extending downwardly from the rear end of the horizontal portion 27. This downward extension is provided with a substantially horizontal rear extension portion 29 and is pivotally secured to the main mounting beam 10 through a heavy-duty vertically situated hitch pin 30 situated towards the wheel assembly collectively designated 12.

Two methods are provided in order to move the main mounting beam assembly together with the swather assembly secured thereto, between a field and transport position and dealing first with FIG. 1, this illustrates a hydraulic method of actuation.

A hydraulic piston and cylinder assembly collectively designated 31 extends between adjacent the rear end 32 of the extension 29 of the hitch pole, and a bracket 33 secured to and extending rearwardly of the main beam assembly 10 with the cylinder 31A being pivotally secured to the bracket by means of pivot pin 34 and the piston rod indicated by reference character 31B, being pivotally connected to adjacent the rear end 32 of the hitch pole, by means of pivot pin 35.

Each wheel assembly 11 and 12 is also provided with a piston and cylinder assembly 36 with the cylinder 36A being pivotally connected to a bracket 37 extending rearwardly from the main mounting beam 10 by means of pivot pin 38 and the piston rod 36B being pivotally connected by means of pivot pin 39, to one end 40 of an actuating lever 41. This lever 41 is secured to the aforementioned pivot pin 20 mounting the wheel assembly for rotation. When the piston and cylinder assemblies 36 are retracted as shown in FIG. 1, the wheels 19 are substantially at right angle to the main mounting beam 10 and are in the field position. However when the piston and cylinder assemblies 36 are extended, the wheels swing through approximately 90° to the axis of the main mounting beam and are in the transport position as shown in full line in FIG. 7.

It is desirable that there is cooperation between the piston and cylinder assembly 31 and the piston and cylinder assemblies 36 so that when the hitch pole is moved between the field and transport positions as will hereinafter be described, the wheel assemblies are also moved concurrently.

As mentioned previously, the piston and cylinder assembly 31 is used to adjust the position of the hitch pole assembly 23. When in the position shown in solid line in FIG. 1, the main mounting beam and the pull type swather assembly secured thereto is in the field position as shown in FIG. 2. However when the piston and cylinder assembly 31 is retracted, the hitch pole is moved through approximately 36° to the position shown in phantom in FIG. 1 so that as the tractor is moved forwardly, the positioning of the hitch pole upon the beam by means of pivot pin 30, causes the main mounting beam together with the swather assembly attached thereto, to take up the in line astern position illustrated schematically in FIG. 3.

In this position as shown the hitch pole 27 extends forwardly and transversely across the swather so that the swather is supported on one side by the wheels 11 and 12 and on the other side effectively by the hitch pole 27. Thus the only wheels 11 and 12 are on one side and no additional wheels are necessary, the complete support for the swather being provided by the hitch pole 27 and the wheels 11, 12.

The hydraulic system shown schematically in FIG. 8 is exemplary only and refers to the actuation of a piston and cylinder assembly collectively designated 42 which extends from the table 15 to knife 14 and the main mounting beam 10 for raising and lowering the table assembly between the field and transport positions.

It includes a motor 43 operating the hydraulic pump 44 drawing oil from reservoir 45 and routing same to the actuating valve 46 which in turn extends to either side of the piston and cylinder assembly 42 in a conventional manner.

A sequencing valve 47 is operatively connected between the piston and cylinder assembly 42 and the wheel actuating piston and cylinder assemblies 36 and is set so that when the table is raised to the fully raised position, it operates to feed oil to the wheel piston and cylinder assemblies 36 thus moving them from the field position to the transport position. It also activates cylinder assembly 31 to retract into the transport position (not shown in FIG. 8).

Similarly, the sequencing valve is actuated when the table assembly is lowered to the field position thus moving the wheel assemblies and hitch assembly to the field position.

FIG. 9 shows a mechanical embodiment in which the extension 29 of the hitch pole is secured to a linkage means collectively designated 48. This includes a link 49 to which the rear end 32 of the extension 29 is secured with one end of link 49 being pivotally connected to the distal end of the link or arm 41 by means of pivot pin 50 and by the other end thereof to the distal end of the link or arm 41 of the wheel assembly 12, by means of pivot pin 50. An intermediate pivot connection 52 is provided in the linkage 49 to accommodate the arcuate movement of the end 32 when moving through approximately 36°.

In this embodiment, the tractor itself is used to move the assemblies between the field and transport positions. By turning the tractor to the left with reference to FIG. 2, the hitch pole 23 is pulled to the position shown in phantom and at the same time the linkage 48 moves the wheels from the field to transport positions. Conversely when the tractor is turned forwardly again, the hitch pole is moved back to the position shown in solid line once again allowing the linkage to move the wheels to the field position.

In this embodiment, it is necessary to provide a closed ended slot 53 in the link portion 49A into which the pivot pin 50 engages in order to permit actuation of the linkage without stress occurring to the parts. Also, one of the wheel assemblies 11 or 12 should be detachably pinned in either positions by means of a pin 54 engaging through the arm 41 and through one of the apertured lugs 54A or 54B tending from the beam 10.

Although the preferred embodiment permits the attachment of existing pull type swather components to the main mounting beam assembly, nevertheless it will be appreciated that it can be provided as original equipment and as a total combination.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A mounting assembly for a pull type swather comprising in combination an elongate main mounting beam, two wheel assemblies each separately mounted beneath the beam adjacent a respective end thereof for pivotal movement around a respective vertical axis, from a field position in which the wheel assemblies lie at right angles to the beam for movement of the beam transverse to its length to a transport position in which the wheel assemblies lie substantially parallel to the beam for movement of the beam along its length and vice versa, in both of which positions both wheel assemblies lie effectively beneath said beam, field working components mounted on the beam and extending along one side thereof, a hitch pole assembly pivotally secured by adjacent one end thereof to said main mounting beam adjacent one end of said main mounting beam, and means to move said hitch pole assembly relative to said main mounting beam from a field position to a transport position and vice versa, in both of which positions said hitch pole assembly extends from said beam to a position on the side of said components opposite said beam to provide with said two wheel assemblies complete support for said components.

2. The assembly according to claim 1 in which said means to move said hitch pole assembly includes an extension on said hitch pole assembly at the other end thereof, and beyond the pivotal securement thereof to said main mounting beam, and a hydraulic piston and cylinder assembly operatively connected between said extension and said main mounting beam.

3. The mounting assembly according to claim 1 which includes means to move said wheel assemblies from a field position to a transport position and vice versa, said means to move said wheel assemblies including a hydraulic piston and cylinder assembly operatively extending between each of said wheel assemblies and said main mounting beam.

4. The mounting assembly according to claim 2 which includes means to move said wheel assemblies from a field position to a transport position and vice versa, said means to move said wheel assemblies including a hydraulic piston and cylinder assembly operatively extending between each of said wheel assemblies and said main mounting beam.

5. The mounting assembly according to claim 1 in which said means to move said hitch pole assembly relative to said main mounting beam includes an extension on said hitch pole assembly at the other end thereof and beyond the pivotal securement of said hitch pole assembly to said main mounting beam and linkage means operatively extending between said extension and both of said wheel assemblies for moving same from a field position to a transport position and vice versa concurrently with moving said hitch pole assembly from a field position to a transport position and vice versa.

6. The mounting assembly according to claim 5 in which said linkage means includes a lever secured to and extending from each of said wheel assemblies for rotating same around a vertical axis, a cross link assembly pivotally connected by the ends thereof one each to each of the distal ends of said levers, said extension being operatively connected to said cross link assembly intermediate the ends thereof.

7. The mounting assembly according to claim 1 which includes the combination of swather table, a knife assembly and a reel assembly operatively secured to said main mounting beam and extending forwardly thereof.

8. The mounting assembly according to claim 7 in which said means to move said hitch pole assembly includes an extension on said hitch pole assembly at the other end thereof, and beyond the pivotal securement thereof to said main mounting beam, and a hydraulic piston and cylinder assembly operatively connected between said extension and said main mounting beam.

9. The mounting assembly according to claim 7 which includes means to move said wheel assemblies from a field position to a transport position and vice versa, said means to move said wheel assemblies including a hydraulic piston and cylinder assembly operatively extending between each of said wheel assemblies and said main mounting beam.

10. The mounting assembly according to claim 8 which includes means to move said wheel assemblies from a field position to a transport position and vice versa, said means to move said wheel assemblies including a hydraulic piston and cylinder assembly operatively extending between each of said wheel assemblies and said main mounting beam.

11. The mounting assembly according to claim 7 in which said means to move said hitch pole assembly relative to said main mounting beam includes an extension on said hitch pole assembly at the other end thereof and beyond the pivotal securement of said hitch pole assembly to said main mounting beam and linkage means operatively extending between said extension and both of said wheel assemblies for moving same from a field position to a transport position and vice versa concurrently with moving said hitch pole assembly from a field position to a transport position and vice versa.

12. The mounting assembly according to claim 11 in which said linkage means includes a lever secured to and extending from each of said wheel assemblies for rotating same around a vertical axis, a cross link assembly pivotally connected by the ends thereof one each to each of the distal ends of said levers, said extension being operatively connected to said cross link assembly intermediate the ends thereof.

* * * * *